United States Patent
Eul et al.

(10) Patent No.: US 9,078,342 B2
(45) Date of Patent: Jul. 7, 2015

(54) EXTERNAL CONTROL STAND FOR A CONSTRUCTION MACHINE

(71) Applicant: JOSEPH VOEGELE AG, Ludwigshafen/Rhein (DE)

(72) Inventors: Achim Eul, Mannheim (DE); Martin Buschmann, Neustadt (DE)

(73) Assignee: JOSEPH VOEGELE AG (DE)

( * ) Notice: Subject to any disclaimer, the term of this patent is extended or adjusted under 35 U.S.C. 154(b) by 173 days.

(21) Appl. No.: 13/851,530

(22) Filed: Mar. 27, 2013

(65) Prior Publication Data

US 2013/0258567 A1 Oct. 3, 2013

(30) Foreign Application Priority Data

Mar. 29, 2012 (DE) .................. 20 2012 003 217 U

(51) Int. Cl.
| | |
|---|---|
| *H05K 5/00* | (2006.01) |
| *B60R 11/02* | (2006.01) |
| *E01C 19/48* | (2006.01) |
| *B60R 11/00* | (2006.01) |

(52) U.S. Cl.
CPC .......... *H05K 5/0017* (2013.01); *B60R 11/0264* (2013.01); *B60R 2011/004* (2013.01); *E01C 19/48* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,636,442 | B1* | 1/2014 | Sopko et al. .................... | 404/79 |
| 2006/0025914 | A1* | 2/2006 | Buschmann .................... | 701/50 |
| 2010/0089050 | A1* | 4/2010 | Filla ................................ | 60/433 |
| 2011/0236131 | A1* | 9/2011 | Heindtel ......................... | 404/83 |
| 2012/0213585 | A1* | 8/2012 | Schmidt et al. ................. | 404/75 |
| 2013/0082161 | A1* | 4/2013 | Eul et al. .................... | 250/201.1 |
| 2013/0189033 | A1* | 7/2013 | Roetsch et al. .............. | 404/122 |

FOREIGN PATENT DOCUMENTS

| | | |
|---|---|---|
| CN | 2104490 U | 4/1991 |
| CN | 1728486 A | 2/2006 |
| DE | 29902946 U1 | 5/1999 |
| DE | 102006041271 A1 | 10/2007 |
| EP | 1627774 A1 | 2/2006 |
| JP | 5950174 U | 4/1984 |
| JP | 07183667 A | 7/1995 |
| JP | 10285669 A | 10/1998 |
| JP | H11-095215 A | 4/1999 |
| JP | 2010-011333 A | 1/2010 |
| JP | 2011089387 A | 5/2011 |

OTHER PUBLICATIONS

Japanese Office Action Dated May 30, 2014, Application No. 2013-069553, Dispatch No. 299657, 6 Pages.

(Continued)

*Primary Examiner* — Lisa Lea Edmonds
(74) *Attorney, Agent, or Firm* — Brooks Kushman P.C.

(57) ABSTRACT

An external control stand for controlling at least one working component of an self-propelled construction machine comprises at least one display panel and a plurality of input elements, the external control stand comprising at least one mounting section to mount it to the construction machine. The external control stand is characterized in that it comprises a lower shell, an upper shell, and an impact protection, the impact protection being configured to be in contact with the lower shell and the upper shell.

18 Claims, 5 Drawing Sheets

(56) References Cited

OTHER PUBLICATIONS

Trimble Navigation Limited 2002, Fetigersystem ScreedPro, 2 Pages.
German Search Report Dated Feb. 27, 2013, Application No. 20 2012 003 217.8—Applicant Joseph Voegele AG, 2 Pages.
Extended European Search Report Dated Jul. 5, 2013, Application No. 13001587.8-1808, Applicant Joseph Voegele AG, 6 Pages.
Chinese Office Action Dated Dec. 29, 2014, Application No. 2013101098144, Applicant Joseph Voegele AG, 5 Pages.
Japanese Office Action Dated Apr. 28, 2015, Application No. 2013-069553, 3 Pages.

* cited by examiner

EXTERNAL CONTROL STAND FOR A CONSTRUCTION MACHINE

CROSS-REFERENCE TO RELATED APPLICATIONS

This application claims foreign priority benefits under 35 U.S.C. §119(a)-(d) to German patent application number DE 20 2012 003 217.8, filed Mar. 29, 2012, which is incorporated by reference in its entirety.

TECHNICAL FIELD

The disclosure relates to an external control stand for a self-propelled construction machine by means of which at least one working component of the construction machine can be controlled.

BACKGROUND

From practice, self-propelled construction machines with external control stands are known which permit a user to make adjustments at a working component of the construction machine while driving. For example, such a construction machine can be a road finishing machine whose extendable screed is adapted to the course of the road during the drive.

SUMMARY

It is an object of the present disclosure to provide an external control stand for a construction machine wherein robustness is increased and simultaneously the number of parts of the external control stand is reduced with preferably constructively simple means.

The external control stand according to the disclosure is provided for controlling at least one working component of a self-propelled construction machine. The external control stand has at least one display panel and a plurality of input elements. The external control stand furthermore comprises at least one mounting section for mounting it to the construction machine. The external control stand according to the disclosure is characterized in that it comprises an upper shell, a lower shell, and an impact protection, the impact protection being configured to be in contact with the lower shell and the upper shell. Thus, the impact protection fulfills two advantageous tasks—which are to protect the external control stand from mechanical influences, such as impacts or damages if it falls down, and to prevent the penetration of soiling into the external control stand. For this purpose, the impact protection preferably also serves as a seal for the external control stand.

To ensure particularly efficient protection, the impact protection can be embodied as a circumferential and/or one-piece member. This avoids abutting surfaces by individual parts which are strung together and facilitates assembly.

It is particularly advantageous for the impact protection to be made of an elastic material to protect the external control stand particularly effectively from impacts or from damages when it falls down.

In a particularly advantageous embodiment variant of the disclosure, the lower shell and/or the upper shell have a groove-shaped recess to receive the impact protection in it. This also permits a form-locking connection between the impact protection and/or the lower shell and/or upper shell.

Preferably, the impact protection has a projecting sealing section which is configured to form a form-locking connection with the lower shell and/or upper shell. This secures the impact protection against sliding away and retains it securely at the point to be protected or the area to be protected at the shells of the external control stand.

It is particularly advantageous for the projecting sealing section to be of a T-shape. Thereby, the positive connection between the shells and the impact protection can be formed particularly easily and effectively.

In a further advantageous embodiment variant, the impact protection partially or completely projects beyond the lower shell and/or the upper shell.

Preferably, the external control stand is detachably mounted to the construction machine. Thereby, the complete external control stand can be carried by one operator and thus permits a particularly safe and ergonomic operation of the construction machine.

To be able to operate the external control stand or the construction machine also in darkness, for example in road tunnels or at night, the at least one display panel and/or the plurality of input elements can be illuminated by a background lighting. Thereby, one can distinguish between important symbols, in particular warning symbols, or keys even in darkness, thus permitting a safe operation of the construction machine.

It is particularly advantageous for the background lighting to comprise a light conductor. This permits a particularly inexpensive lighting of the external control stand as only a few components are required for lighting.

It is particularly advantageous for the at least one light conductor to comprise one or several light conductor plates. Thereby, a particularly compact design of the external control stand can be achieved.

To achieve an advantageous operability for the operators, the external control stand can have grips. The external control stand can thus be comfortably and securely held in hands.

The advantages of the external control stand according to the disclosure can be particularly well utilized in a road finishing machine or charger.

The external control stand can be particularly advantageously utilized if it is used for controlling a screed of a road finishing machine.

It is advantageous for the external control stand to comprise an adjusting wheel for controlling the extension width of the screed. By this, a particularly secure and intuitive control of the screed can be achieved.

The disclosure also relates to a construction machine, for example a road finishing machine or a charger, with an external control stand of the type described above.

Below, an advantageous embodiment of the disclosure will be illustrated more in detail with reference to the attached drawings.

DETAILED DESCRIPTION

Figure 1:
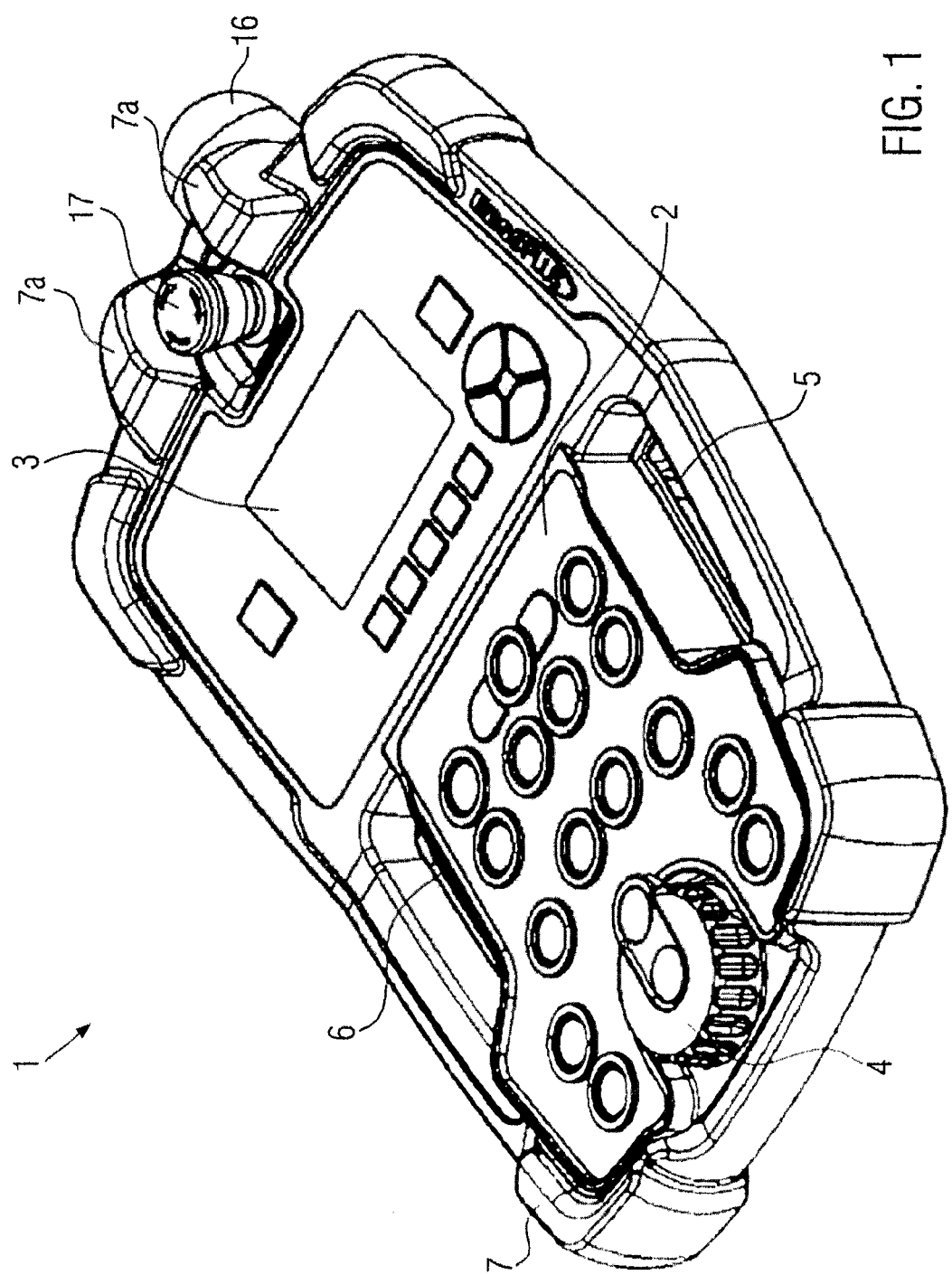
FIG. 1 is a perspective view of an external control stand according to the disclosure.

Equal components are always provided with the same reference numerals in the figures.

FIG. 1 shows a perspective view of an external control stand 1 according to the disclosure. It can be used for controlling a self-propelled construction machine 100, preferably a road finishing machine or a charger.

Normally, the external control stand 1 is disposed at or near a working component of the construction machine 100. For example, the working component is an extendable screed 110 of a road finishing machine 100 which can be adapted to the course of the road during the laying drive of the road finishing machine 100. Here, preferably several parameters of the working component 110 can be adjusted, for example the screed's width or height.

For the control of the working component 110, the external control stand 1 comprises a plurality of input elements 2 at its upper side by which important functions or the adjustable parameters of the working component can be controlled or adjusted. To be able to display important parameters, operational conditions or settings to the user, the external control stand 1 furthermore has at least one display panel 3 at its upper side.

One can clearly see in FIG. 1 that the external control stand 1 comprises an adjusting wheel 4 for influencing the width of an extendable screed 110 of a road finishing machine. One can also clearly see the grips 5, 6 which are laterally integrated in the external control stand 1 and through which a user can grip to permit to securely hold the external control stand 1.

Figure 2:
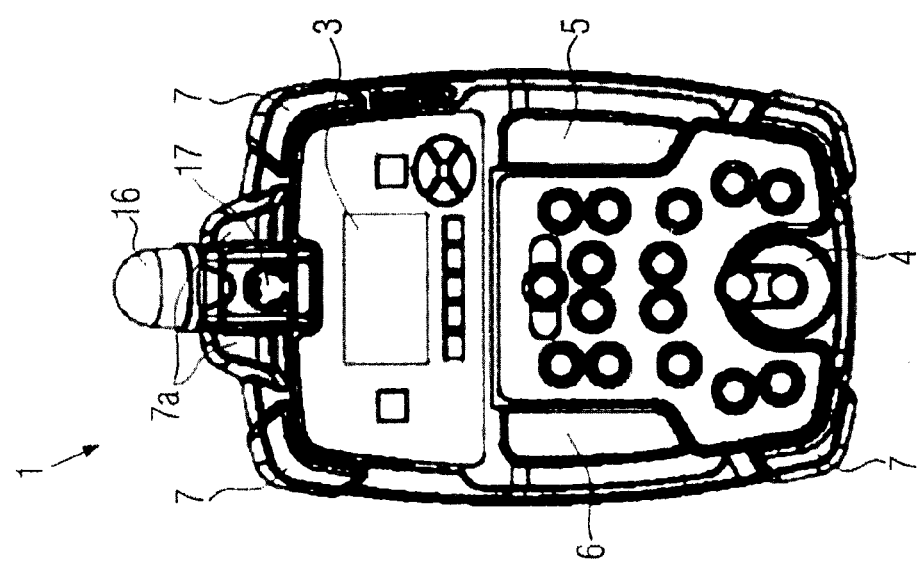
FIG. 2 is a schematic plan view of an external control stand according to the disclosure.

FIG. 2 shows a schematic plan view of the external control stand 1 according to the disclosure. One can clearly see that the external control stand 1 has an impact protection 7 at all side faces which protects the external control stand 1 from external influences, such as mechanical stresses, dust or other soiling. The impact protection 7 is made of weather-resistant and/or elastic material, preferably rubber or plastics. In this embodiment, the impact protection 7 is implemented as a one-piece member circumferential to the external control stand 1. For an even more efficient protection of the upper side of the external control stand 1, the impact protection 7 has a region 7a that projects further to function as a kind of shock absorber.

Figure 3:
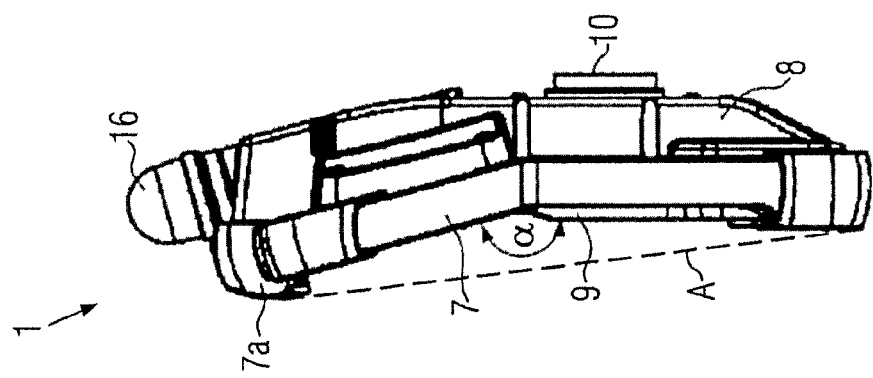
FIG. 3 is a side view of an external control stand according to the disclosure.

FIG. 3 shows the external control stand 1 according to the disclosure in a schematic side view. The assembly of the external control stand 1 comprising a lower shell 8 and an upper shell 9 is particularly clearly depicted. The lower shell 8 and the upper shell 9 are made of plastics, preferably by compact injection molding.

Figure 4:
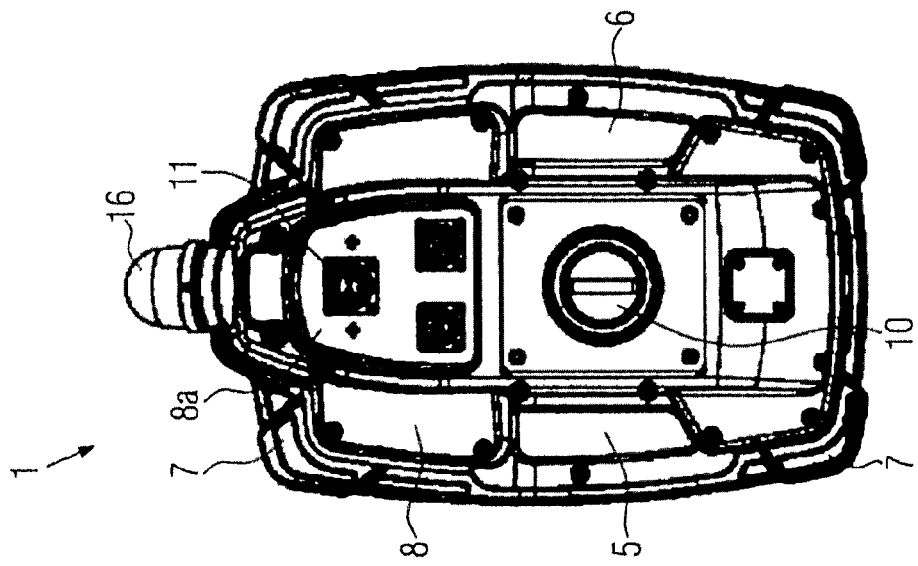
FIG. 4 is a bottom view of an external control stand according to the disclosure.

FIG. 4 shows the external control stand 1 according to the disclosure in a schematic bottom view. The external control stand has a mounting section 10 at its bottom side to mount the external control stand 1 securely and robustly at the construction machine 100. For example, the external control stand 1 can be placed onto a tubular element of the construction machine 100 and secured to it with the mounting section 10. For bidirectional communication with the construction machine or its working components, the external control stand 1 has at least one electrical connection 11 at its bottom side which is arranged, protected from impact influences, in a recess 8a of the lower shell 8.

Figure 5:
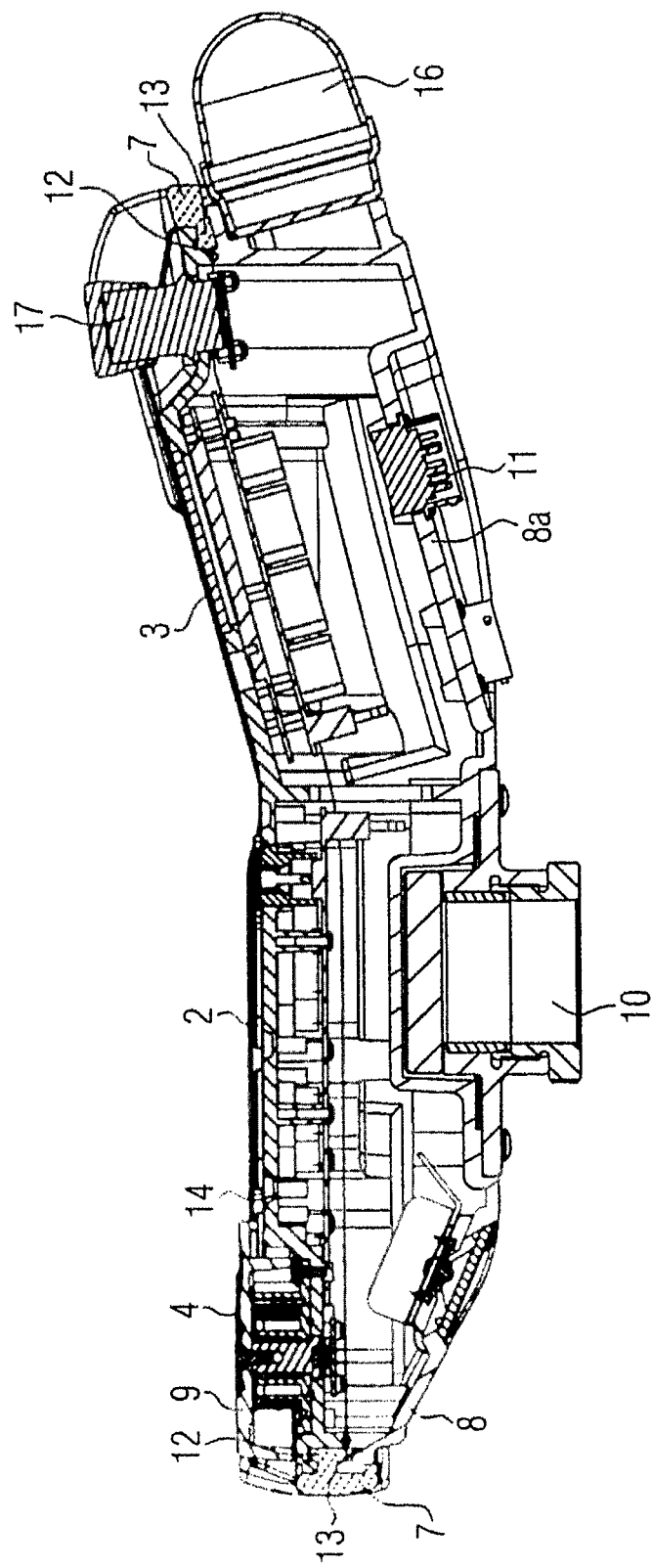
FIG. 5 is a sectional view of an external control stand according to the disclosure.

FIG. 5 shows a sectional view of the external control stand 1 according to the disclosure. The two-shell assembly with the lower shell 8, the upper shell 9 and the impact protection 7 can be particularly clearly seen. The impact protection 7 is configured such that it is in contact with the lower shell 8 and the upper shell 9. To protect the impact protection 7 even in case of high mechanical stresses, for example when the external control stand 1 falls onto hard surfaces, the lower shell 8 and the upper shell 9 form a groove-like recess 12. The latter receives a projecting sealing section 13 of the impact protection 7, in this example of a T-shape. The groove-like recess 12 and the sealing section 13 thereby form a form-locking connection to fix the impact protection 7 in a particularly secure manner. Furthermore, the impact protection 7 covers abutting surfaces of the adjacent lower shell 8 and upper shell 9 with a largely flat area to seal the external control stand 1 against the penetration of soiling.

Figure 6:
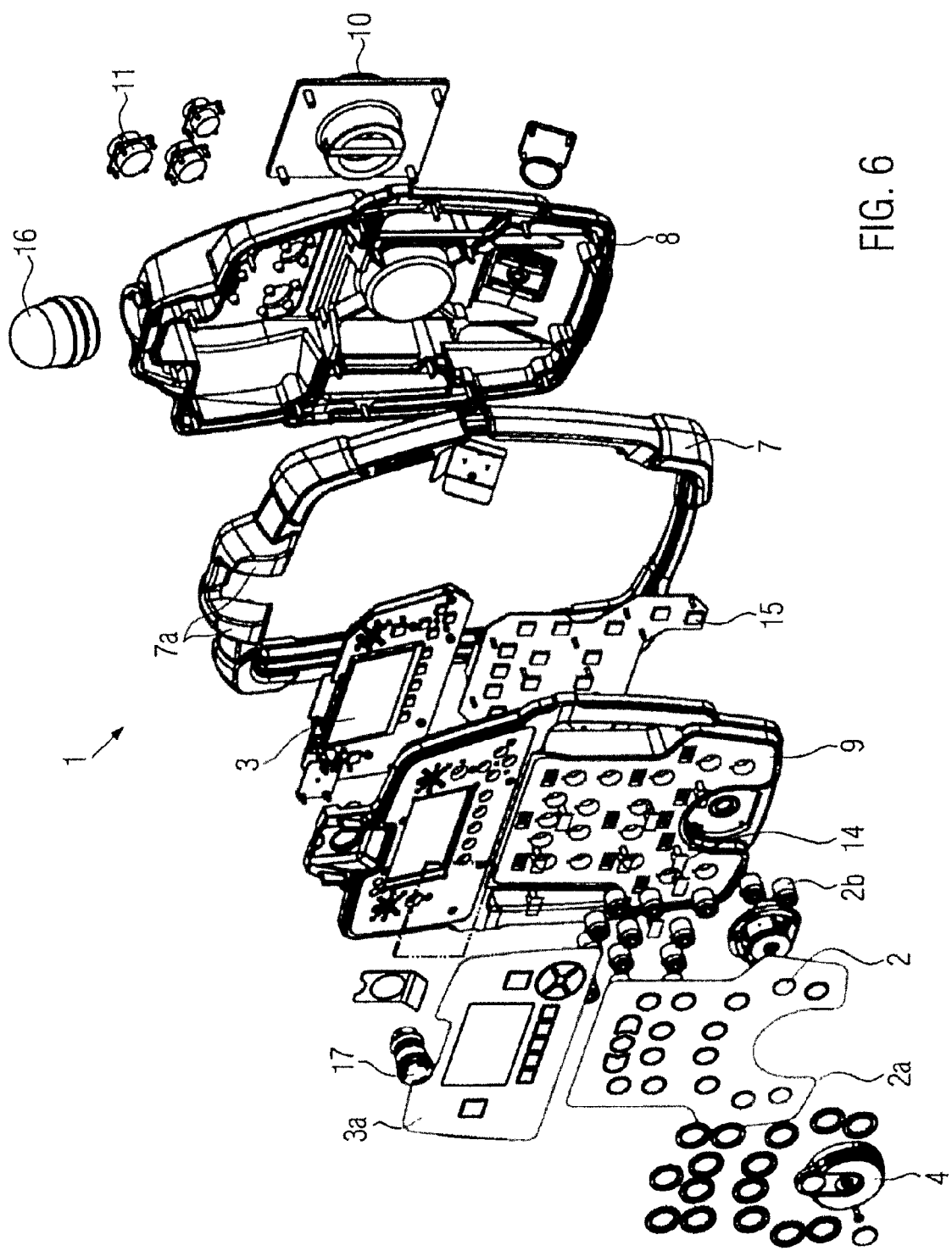
FIG. 6 is an exploded view of an external control stand according to the disclosure.

FIG. 6 shows an exploded view of the external control stand 1 according to the disclosure. One can see particularly well that the plurality of input elements 2 comprises a one-piece cover layer 2a and push elements 2b disposed underneath. The push elements are received by the upper shell 9 and covered by the cover layer 2a such that the penetration of soiling into the external control stand 1 is prevented. A further cover layer 3a covers the display panel 3 and protects it from fusions or moisture. As is depicted in FIG. 3, the cover layers 2a, 3a confine an angle $\alpha$ between them which is preferably smaller than 180°, and is for example between 150° and 175°, in particular approximately 165°. This inclination causes the input elements 2 and/or the display panel 3 to be each disposed underneath a plane A (drawn in a dashed line) which extends from an upper edge to a lower edge of the external control stand 1. Thereby, the inclination by the angle $\alpha$ causes a protection of the input elements 2 and/or the display panel 3 by the impact protection 7 if the external control stand 1 falls down.

In FIG. 6, one can also clearly see a plurality of light conductors 14 which serve to illuminate symbols printed onto the cover layer 2a. The light conductors 14 are in this embodiment designed as light plates to achieve a flat and compact design of the external control stand 1. The light conductors 14 cooperate with a background lighting 15 which generates the light transported by the light conductors 14. As a security feature, the external control stand 1 furthermore has a warning lamp 16 and an emergency switch 17 protected from impact effects by the projecting area 7a of the impact protection 7.

Figure 7:
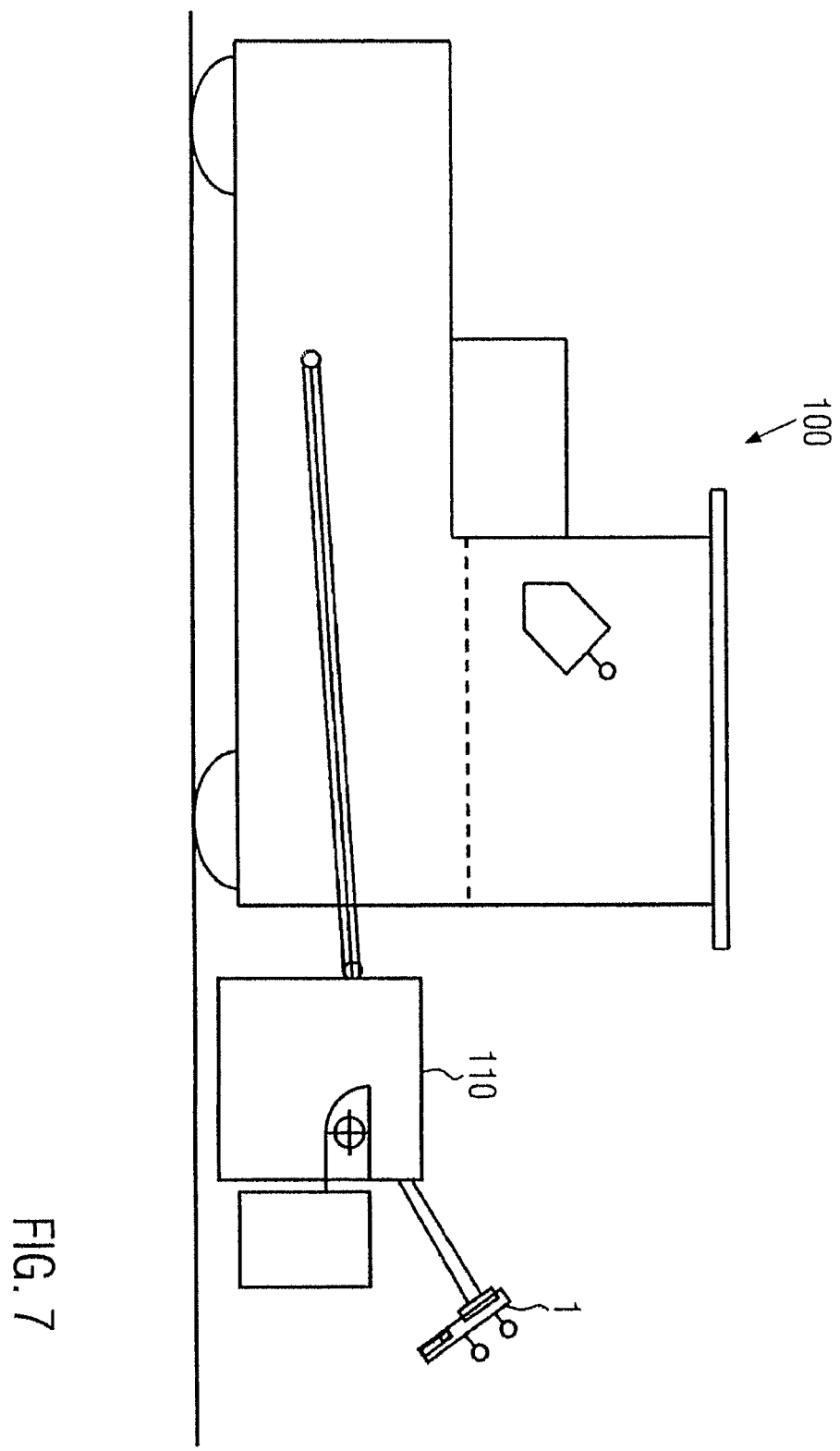
FIG. 7 is a schematic side view of a construction machine with an external control stand according to the disclosure.

FIG. 7 depicts the preferred arrangement of the external control stand 1 at the construction machine 100, in this example a road finishing machine 100.

In a further embodiment variant of the disclosure, the impact protection 7 can have a multi-piece design. For it can be sufficient for some applications if, for example, only the corners of the lower shell 8 and the upper shell 9 are covered by the impact protection 7.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An external control stand for controlling at least one working component of a self-propelled construction machine, the external control stand comprising:
   at least one display panel;
   a plurality of input elements;

at least one mounting section for mounting at the construction machine;
a lower shell;
an upper shell; and
an impact protection configured to be in contact with the lower shell and the upper shell.

2. The external control stand according to claim 1 wherein the impact protection is circumferential.

3. The external control stand according to claim 1 wherein the impact protection is made of an elastic material.

4. The external control stand according to claim 1 wherein the lower shell and/or the upper shell have or form a groove-like recess to receive the impact protection.

5. The external control stand according to claim 1 wherein the impact protection comprises a projecting sealing section which is configured to form a form-locking connection with the lower shell and/or the upper shell.

6. The external control stand according to claim 5 wherein the projecting sealing section has a T-shaped design.

7. The external control stand according to claim 1 wherein the impact protection partially or completely projects beyond the lower shell and/or the upper shell.

8. The external control stand according to claim 1 wherein the external control stand is detachably mountable to the construction machine.

9. The external control stand according to claim 1 further comprising background lighting for illuminating the at least one display panel and/or the plurality of input elements.

10. The external control stand according to claim 9 wherein the background lighting comprises at least one light conductor.

11. The external control stand according to claim 10 wherein the at least one light conductor is a light conductor plate.

12. The external control stand according to claim 1 further comprising grips.

13. The external control stand according to claim 1 further comprising first and second cover layers for covering the input elements and the at least one display panel, respectively, and the cover layers confine an angle ($\alpha$) of less than 180°.

14. The external control stand according to claim 1 further comprising at least one electrical connection at its bottom side, and the at least one electrical connection is disposed in a recess of the lower shell.

15. A construction machine comprising:
a working component; and
an external control stand for controlling the working component, the external control stand including a display panel, a plurality of input elements, at least one mounting section for mounting at a location on the construction machine, a lower shell, an upper shell, and an impact protection configured to be in contact with the lower shell and the upper shell.

16. The construction machine according to claim 15 wherein the construction machine is a road finishing machine or a charger.

17. The construction machine according to claim 15 wherein the construction machine is a road finishing machine, and the working component is a screed.

18. The construction machine according to claim 17 wherein the external control stand further comprises an adjusting wheel for controlling extension width of the screed.

* * * * *